H. HESS.
CAGE FOR ANTIFRICTION BEARINGS.
APPLICATION FILED JULY 15, 1909.
1,096,531.
Patented May 12, 1914.
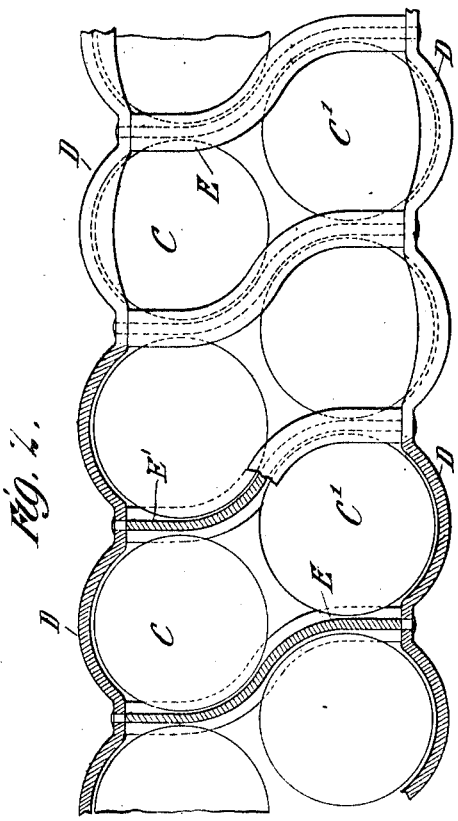
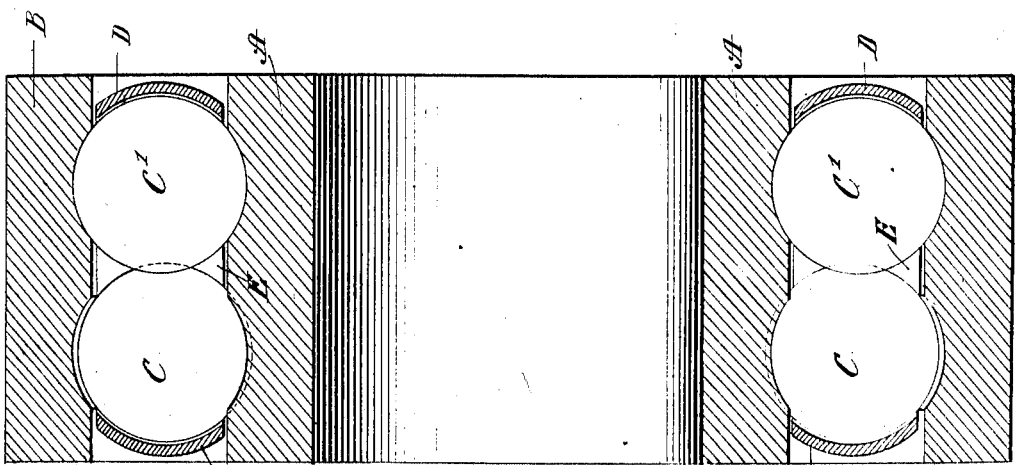
Witnesses:
Inventor
HENRY HESS,
By his Attorneys

UNITED STATES PATENT OFFICE

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

CAGE FOR ANTIFRICTION-BEARINGS.

1,096,531.  Specification of Letters Patent.  Patented May 12, 1914.

Application filed July 15, 1909. Serial No. 507,695.

*To all whom it may concern:*

Be it known that I, HENRY HESS, citizen of the United States, residing at Wawa, in the county of Delaware and State of Pennsylvania, have invented certain new and useful Improvements in Cages for Antifriction-Bearings, of which the following is a specification, reference being had therein to the accompanying drawing.

My invention relates to cages for antifriction bearings and more particularly to that class thereof adapted for use in connection with a plurality of series of rolling elements.

In bearings of the kind described, the rolling elements of the several series are frequently arranged in alternated or staggered relations to each other, and moreover the rolling elements of one series project over and into the path of the other series.

It is one of the purposes of my invention to provide a cage for such rolling elements, which, broadly speaking, comprises lateral retaining rings arranged at the outsides of the several series, and attached firmly to each other by diagonally disposed connecting pieces, which pass from one ring to the other and extend between the rolling elements of the several series, the diagonal disposition of the connecting pieces being necessitated by the relative location of the rolling elements as previously described.

In the accompanying drawing I have illustrated my improvement as applied to a ball bearing provided with two series of balls, but obviously its use is not necessarily limited thereto, as it might similarly be employed in connection with roller bearings, and also with anti-friction bearings of either type employing a greater or smaller number of series of rolling elements.

Generally speaking I desire it to be understood that my invention is not limited to any particular form of details except in so far as such limitations are specified in the claims.

Referring to the drawing: Figure 1 is a transverse section of a multiple-series ball bearing having my invention applied thereto; Fig. 2 is a diagrammatic or developed view of the balls and cage thereof.

The bearing shown by way of example in the drawing comprises an inner ring A and an outer ring B, between which are located two series of balls C and C¹. These balls are staggered or alternated, and it is also to be noted that the balls of one series project over and into the path of the balls of the other series, as clearly shown in the drawing. It will be similarly noted that the number of balls in each series is so far increased that they also overlap circumferentially as well as transversely, in the manner previously described. The balls are retained in their alternated or staggered relation by means of a cage which is the subject matter proper of my invention. As shown in Figs. 1 and 2, this cage comprises two outer lateral retaining rings D, D, which rings are shaped or curved to correspond to the contour of the proximate balls (see Fig. 2). The rings D, D are firmly connected to each other by the diagonally located pieces E, E, which are also curved to correspond to the contour of the balls. The diagonal disposition of these connecting pieces is necessitated by the staggered relation of the series of balls, as previously described, and moreover permits a larger number of balls to be employed, which in the form illustrated is substantially or nearly the full complement thereof. The connecting pieces E, E, which pass from one ring to the other and between the balls of the several series, may also be provided with cavities conforming to the contour of the proximate balls, as shown by dotted lines at E¹, E¹, Fig. 2.

Having thus described my invention, its construction and mode of operation, what I claim and desire to secure by Letters Patent of the United States is as follows:

1. A cage for ball bearings having a plurality of series of balls, the said cage consisting of lateral retaining rings and diagonally located and curved connecting pieces passing from one to the other and extending between the balls, both the retaining rings and the connecting pieces being formed with cavities conforming to the contour of the balls.

2. A ball bearing, comprising bearing rings having parallel raceways therein, balls in said raceways, retainer rings at opposite sides of said bearing rings, and a plurality of plates bent to provide a space for each ball and connected to said retainer rings, the respective portions of said plates being parallel.

3. A retainer for ball bearings, comprising a pair of retaining rings, and plates approximately Z-shaped in cross-section connecting said rings and providing two sets of alternately arranged ball spaces.

4. A retainer for ball bearings, comprising two retainer rings, and a plurality of retainer plates connected at their ends in said rings, said plates being offset centrally and arranged to provide two sets of alternately disposed ball spaces.

In testimony whereof I have affixed my signature in presence of two witnesses.

HENRY HESS.

Witnesses:
NETTIE L. HAHN,
MARY M. CALLA.

---

Copies of this patent may be obtained for five cents each, by addressing the "Commissioner of Patents Washington, D. C."